(12) United States Patent
Martinson et al.

(10) Patent No.: US 11,556,883 B2
(45) Date of Patent: Jan. 17, 2023

(54) CACHED DATA REPRESENTATIONS FOR SERVICE SCHEDULE AVAILABILITY

(71) Applicant: BBY SOLUTIONS, INC., Richfield, MN (US)

(72) Inventors: Kurt Martinson, Saint Anthony, MN (US); Jason Peterson, Lakeville, MN (US); Jude Miron, Apple Valley, MN (US); Rambabu Raipati, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 786 days.

(21) Appl. No.: 15/459,764

(22) Filed: Mar. 15, 2017

(65) Prior Publication Data

US 2018/0268349 A1    Sep. 20, 2018

(51) Int. Cl.
G06Q 10/00    (2012.01)
G06Q 10/08    (2012.01)
G06Q 10/10    (2012.01)

(52) U.S. Cl.
CPC ....... *G06Q 10/083* (2013.01); *G06Q 10/1093* (2013.01)

(58) Field of Classification Search
CPC combination set(s) only.
See application file for complete search history.

(56) References Cited

U.S. PATENT DOCUMENTS

| | | | |
|---|---|---|---|
| 7,295,990 B1 | 11/2007 | Braumoeller et al. | |
| 7,437,305 B1 | 10/2008 | Kantarjiev et al. | |
| 7,747,543 B1 | 6/2010 | Braumoeller | |
| 8,249,917 B1 | 8/2012 | Kassmann | |
| 8,374,922 B1 | 2/2013 | Antony | |
| 8,527,373 B1 | 9/2013 | Ricci et al. | |
| 8,615,473 B2 | 12/2013 | Spiegel | |

(Continued)

OTHER PUBLICATIONS

"Is Ship-from-Shore Distribution Right For Your?", © Fortna, (2015), 1-7.

(Continued)

*Primary Examiner* — Hafiz A Kassim
*Assistant Examiner* — Matheus Ribeiro Stivaletti
(74) *Attorney, Agent, or Firm* — Schwegman Lundberg & Woessner, P.A.

(57) ABSTRACT

Techniques and system configurations for use of cached data to generate and present a schedule or other availability information for delivery and service scheduling of a product are disclosed herein. In an example, electronic operations used for offering cached availability information in a user interface include: obtaining service information to identify a service for a product (such as installation or removal) that can accompany, precede, or follow, delivery of a product; obtaining customer information to identify a geographic location to perform the service for the product; retrieving, from a cached data store, availability information to perform the service for the product based on the geographic location and the service information; and presenting the availability information to perform the service in association with the delivery of the product. With this technique, a calendar or schedule can be produced from cached data, without requiring multiple requests to a scheduling system.

27 Claims, 9 Drawing Sheets

(56) References Cited

U.S. PATENT DOCUMENTS

| | | | |
|---|---|---|---|
| 9,152,987 B1 | 10/2015 | Petrich | |
| 9,934,530 B1* | 4/2018 | Iacono | G06Q 30/0639 |
| 10,387,824 B2* | 8/2019 | Gillen | G06Q 50/01 |
| 2001/0027481 A1* | 10/2001 | Whyel | G06Q 10/109 |
| | | | 709/218 |
| 2001/0049619 A1 | 12/2001 | Powell et al. | |
| 2002/0107716 A1* | 8/2002 | Callahan | G06Q 10/06311 |
| | | | 705/7.21 |
| 2002/0157089 A1* | 10/2002 | Patel | H04L 67/2804 |
| | | | 717/178 |
| 2003/0171996 A1 | 9/2003 | Chen et al. | |
| 2004/0064351 A1* | 4/2004 | Mikurak | G06Q 10/087 |
| | | | 705/22 |
| 2005/0043037 A1* | 2/2005 | Ioppe | H04W 4/029 |
| | | | 455/456.1 |
| 2008/0294491 A1* | 11/2008 | Hersh | G06Q 10/08 |
| | | | 705/7.13 |
| 2011/0054978 A1 | 3/2011 | Mohil | |
| 2012/0265632 A1 | 10/2012 | Patro | |
| 2013/0013454 A1 | 1/2013 | Sears | |
| 2013/0054805 A1* | 2/2013 | Lipari | G06Q 10/1091 |
| | | | 709/226 |
| 2014/0095350 A1 | 4/2014 | Carr et al. | |
| 2014/0279277 A1 | 9/2014 | Pei | |
| 2015/0046363 A1* | 2/2015 | McNamara | G06Q 10/0635 |
| | | | 705/333 |
| 2015/0100447 A1 | 4/2015 | Bohbot | |
| 2015/0294262 A1* | 10/2015 | Nelson | G06Q 10/083 |
| | | | 705/330 |
| 2015/0363843 A1* | 12/2015 | Loppatto | G06Q 10/083 |
| | | | 705/330 |
| 2016/0034995 A1* | 2/2016 | Williams | G06Q 30/0617 |
| | | | 705/26.43 |
| 2016/0103559 A1* | 4/2016 | Maheshwari | G06F 3/0481 |
| | | | 715/738 |
| 2016/0180288 A1* | 6/2016 | Sager | G06Q 50/28 |
| | | | 705/333 |
| 2016/0267228 A1* | 9/2016 | Van Wyck | G06F 19/3418 |
| 2016/0270137 A1* | 9/2016 | Yong | H04W 8/005 |
| 2016/0335686 A1* | 11/2016 | AthuluruTlrumala et al. | |
| | | | H04N 21/44222 |
| 2016/0379213 A1* | 12/2016 | Isaacson | G06F 3/048 |
| | | | 705/44 |
| 2017/0011449 A1* | 1/2017 | Mueller | G06Q 30/0635 |
| 2017/0024804 A1 | 1/2017 | Tepfenhart, Jr. et al. | |
| 2017/0031887 A1* | 2/2017 | Franczyk | G06F 40/106 |
| 2017/0083911 A1* | 3/2017 | Phillips | G06Q 20/065 |
| 2017/0206589 A1* | 7/2017 | Deshpande | G06N 20/00 |
| 2017/0262804 A1* | 9/2017 | Shroff | G06Q 10/0833 |
| 2017/0278062 A1 | 9/2017 | Mueller et al. | |
| 2018/0075399 A1* | 3/2018 | Agarwal | C02F 1/42 |
| 2018/0225796 A1* | 8/2018 | Liu | G06Q 50/30 |
| 2018/0268455 A1 | 9/2018 | Shiely et al. | |
| 2019/0197798 A1* | 6/2019 | Abari | G06Q 50/30 |

OTHER PUBLICATIONS

"Ship-from-Shore Distribution: Reducing the Impact of an Imperfect Forecast", © Fortna, (2015), 1-7.

"U.S. Appl. No. 15/459,708, Non Final Office Action dated Mar. 5, 2019", 19 pgs.

"U.S. Appl. No. 15/459,708, Response fiied Jul. 5, 2019 to Non-Final Office Action dated Mar. 5, 2019", 14 pgs.

"U.S. Appl. No. 15/459,708, Advisory Action dated Jan. 21, 2020", 3 pgs.

"U.S. Appl. No. 15/459,708, Final Office Action dated Oct. 21, 2019", 25 pgs.

"U.S. Appl. No. 15/459,708, Response filed Jan. 9, 2020 to Final Office Action dated Oct. 21, 2019", 10 pgs.

"U.S. Appl. No. 15/459,708, Response filed Jul. 5, 2019 to Non-Final Office Action dated Mar. 5, 2019", 14 pgs.

"U.S. Appl. No. 15/459,708, Notice of Allowance dated May 20, 2020", 18 pgs.

"U.S. Appl. No. 15/459,708, Response filed Apr. 9, 2020 to Final Office Action dated Oct. 21, 2019 and Advisory Action dated Jan. 21, 2020", 14 pgs.

Sterling, Greg, "Google Connects Online And Offline With Local Product Availability", SearchEngineLand, [Online] Retrieved from the internet: <https://searchengineland.com/google-connects-online-and-offline-with-local-product-availability-55863>, (2010), 5 pgs.

* cited by examiner

FIG. 4

Search Results for: ACME Brand Washers

Shop Category
Dryers (30)
Washing Machines (30)
Washer Dryer Combos (2)

All Items (3)   Pick Up Today (1) ~430

Sort By: Delivery Date   My Store: EAGAN, MN   Zip Code 55123 (Change) ~420

Color ~410A
- White (1)
- Black (1)
- Red (1)

Features ~410B
- Stackable
- High-Efficiency
Show more

ACME – 4.5 Cu. Ft. 14 Cycle Front Loading Washer – Red ~422A
- Delivery: FREE   Delivery with installation
  As soon as 1/31/2016   available as soon as 2/2/2016 ~426A
- Store Pickup: EAGAN MN
  Pick up Today ~424A $549.99
ADD TO CART ~428A Price ~410C
- $0 - $249.99 (1)
- $250 - $499.99 (1)
- $500 - $749.99 (1)

ACME – 4.5 Cu. Ft. 12 Cycle Front Loading Washer – Black ~422B
- Delivery: FREE   Delivery with installation
  As soon as 2/1/2016   available as soon as 2/6/2016 ~426B
- Store Pickup: EAGAN MN
  Pick up by 2/2/2016 ~424B $499.99
ADD TO CART ~428B Delivery Date ~410D
- Tomorrow (1)
- 2-3 Business Days (2)
- 4-6 Business Days (3)

Install Date ~410E
- Tomorrow (0)
- 2-3 Business Days (1)
- 4-6 Business Days (3)

ACME – 3.5 Cu. Ft. 14 Cycle Front Loading Washer – White ~422C
- Delivery: FREE   Delivery with installation
  As soon as 2/6/2016   available as soon as 2/6/2016 ~426C
- Store Pickup: EAGAN MN
  Pick up by 2/6/2016 ~424C $249.99
ADD TO CART ~428C

400

CACHED DATA REPRESENTATIONS FOR SERVICE SCHEDULE AVAILABILITY

RELATED APPLICATIONS

The present application includes subject matter related to U.S. patent application Ser. No. 15/459,708, titled "LARGE PRODUCT PRE-SOURCING SEARCH ENGINE", and filed Mar. 15, 2017, the contents of which are incorporated by reference herein.

TECHNICAL FIELD

Embodiments discussed herein generally to user interface functionality and data caching techniques used in electronic computing and communication systems. Certain embodiments discussed herein relate to techniques that present and coordinate information related to service scheduling with the use of a cached availability calendar.

BACKGROUND

A number of electronic systems are commonly used to coordinate the offer and sale of products or services in electronic commerce settings. For example, although a consumer user may access a website or mobile app user interface when attempting to make an electronic commerce purchase, the website or mobile app will often contact a large number of data systems to request and obtain information for product availability, location, cost, shipping information, and the like. Thus, even if a consumer views, selects, and purchases a single product, a large number of electronic processing and data storage systems may be involved to generate the user interface and ultimately fulfill the purchase and to schedule or perform an accompanying service.

The purchase of a specialized product, such as large, heavy, or fragile products that cannot be shipped by common carriers in small boxes, adds additional complexity to the electronic commerce process. There may be various constraints on shipping, handling, and delivery procedures, which are further complicated by fulfillment rules from distributors or retailers. For example, specialized products such as household appliances often require setup and installation services at the time of delivery, leading to additional complexity and coordination from multiple parties. Existing approaches for providing coordinating fulfillment of delivery and installation of specialized products often involves manual human involvement, which leads to incomplete or vague information about service availability and delivery times. Such existing processes may lead to unexpected and unreliable outcomes, and a lack of information for consumers with existing types of user interfaces.

BRIEF DESCRIPTION OF THE DRAWINGS

FIG. 4 illustrates a user interface layout to present and receive information and selection options for product delivery and services according to an example described herein.

DETAILED DESCRIPTION

Figure 1:
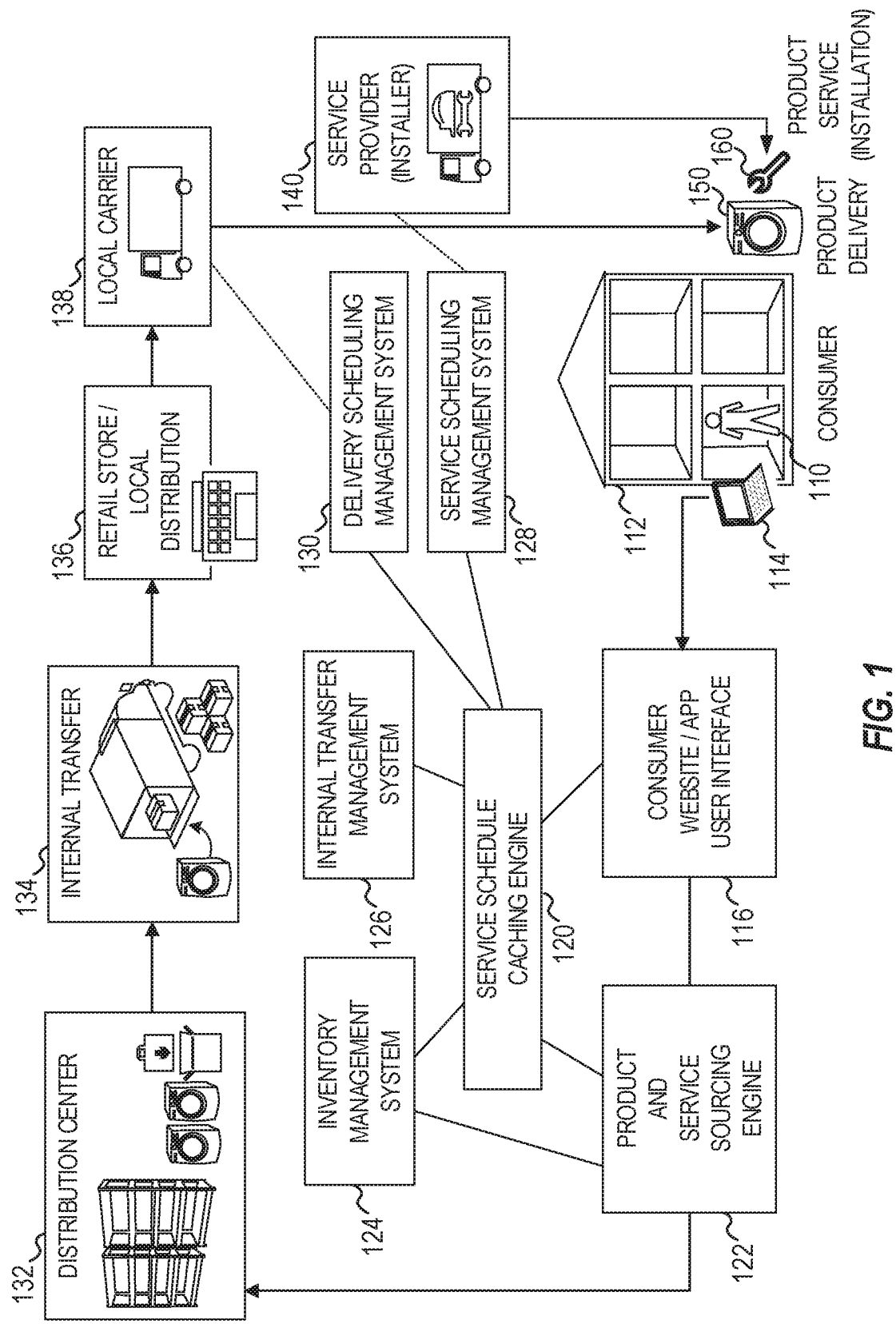
FIG. 1 illustrates an overview of a scenario for product delivery and product service scheduling performed with a consumer according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to techniques implemented within one or more computing systems that provide an online product delivery and services scheduling architecture. As discussed herein, various types of cached data representations for product delivery and service schedule availability may be provided through a user interface, to improve the speed and functionality of a user interface and associated network communication transactions. In an example, a cached data management technique is used to enable fast consumer scheduling of in-home services, including to determine availability for delivery or service scheduling time slots without needing to immediately contact and query an external scheduling system. This technique further enables projected "Get it By" dates to be displayed for multiple products during product browsing, and defers the actual transactions of scheduling the service into a later portion of the electronic processing actions (such as into the shopping cart) used for many types of products and orders.

As further discussed herein, the techniques herein also may enable "Get it delivered by" and "Get it installed by" dates to be displayed during product browsing, including in a list of products or searched results. This results in a faster time to populate a calendar and receive customer selections for in-home delivery and scheduling appointments, increasing the speed of the website during customer checkout and improving resulting customer experiences and data transactions. The caching techniques used herein also may be used to improve the stability and performance of an application or website user interface, by reducing the number of data transactions and calls to external services, thus improving the reliability of associated systems. The caching techniques discussed herein may also improve the stability and performance of external scheduling services by reducing the volumes of transactions from an associated website or app interface that would otherwise be used to query delivery and installation data.

The techniques discussed herein are presented in the context of an architecture that is used to display a user interface for electronic commerce settings, for the sale and scheduling of product transactions, product delivery, and associated services such as product setup and installation. The techniques discussed herein allow further separation between selling functionality and scheduling functionality, to provide greater flexibility to optimize business requirements and system operations. It will be understood, however, that the information caching techniques discussed herein may also be applicable to other types of user interfaces and architectures, including those not directly involving a sale of a product or service.

Prior approaches for utilizing a website or other user interface to scheduling a delivery and an accompanying service, such as installing a television or connecting a large appliance, often involved multiple human-initiated transactions. Such approaches often involved the user interface performing a first request to an external legacy service to request data for available times, performing a second request to the external legacy services to reserve the available time, and performing subsequent and follow-up requests to check other time slots or determine the availability of other services. Even with the use of high speed computer networks, this process is not ideal for use with a customer-facing user interface. Such requests may consume a large amount of time, even as much as 10-20 seconds or more per transaction, which could lead to customer interruptions and abandoned sessions in the user interface for a consumer that is expecting an immediate response from a website or an app.

The techniques discussed herein involve the use of a cached service availability database that hosts data to be presented in an interactive calendar or a like estimated availability chart. The use of this calendar may allow the customer to immediately reserve a time for an accompanying delivery or service if an availability window is estimated as open. As discussed in the following examples, optimization and estimated adjustments to the cached service availability database may occur asynchronously outside of a customer shopping session, allowing reconciliation and updates to occur without interruption or slowing of a consumer transaction.

FIG. 1 illustrates an overview of a scenario for product delivery and product service scheduling performed with a consumer according to an example described herein. As shown, a consumer 110 is located at a consumer location 112 (e.g., a home), and operates a consumer computing device 114 to access a consumer user interface 116. In an example, the consumer user interface 116 is a website or software application interface (e.g., a data service presented by a web server or an "app") that is used for electronic commerce. In the scenario of FIG. 1, the consumer 110 uses the consumer user interface 116 to browse, purchase, and schedule a product delivery 150 that results from a purchase of a particular product (e.g., a home appliance such as a washing machine). An example arrangement of a portion of the consumer user interface 116 is provided in FIG. 4 and further discussed below.

The consumer user interface 116 may be hosted or exposed by an internet-accessible service on behalf of a business entity such as a retailer. The consumer 110 also uses the consumer user interface 116 to browse, purchase, and schedule a product service 160 for the particular product (e.g., installation and setup of the washer), such as at the time of scheduling the product delivery 150 in the consumer user interface 116 (e.g., in the same browsing session or in a subsequent browsing session). The consumer user interface 116 may present various forms of data, in the form of text, graphics, and video, relating to the purchase or specification of the product delivery 150 and the product service 160. The consumer user interface 116 may obtain this information from various data systems and data sources, such as those maintained by the business entity or an associated service provider.

The consumer user interface 116 may include various presentations of information for product delivery and product service scheduling purposes, including presentations of information that are obtained from a cached data source. For example, a cached availability calendar may be provided in the consumer user interface 116 to obtain information from the cached data source in lieu of directly contacting a delivery or scheduling service. The functionality for generating such cached data for a product service is depicted in FIG. 1 as being operated within a service scheduling caching engine 120. The consumer user interface 116 may provide commands and requests to a product and service sourcing engine 122 for scheduling and coordination of the product purchase and the product service.

In an example, the service schedule caching engine 120 is used to present information for cached data availability for product delivery or product service (or combined delivery and service). The service schedule caching engine 120 may coordinate operations with the use of an inventory management system 124 and an internal transfer management system 126, which determines how and when a particular item can be fulfilled. For example, the inventory management system 124 may identify available inventory of a particular product type (e.g., a product type identified by stock-keeping unit (SKU), universal product code (UPC), manufacturer and model identifier, etc.) and a source of a particular product or product specification (e.g., from a retail store, from a distribution center, from a manufacturer); the internal transfer management system 126 may be used to identify schedule constraints and characteristics of logistics to transfer the product among internal channels (e.g., an internal or private distribution or transit network). The service schedule caching engine 120 is further used to coordinate operations with a delivery scheduling management system 130, which processes and facilitates requests for the product delivery 150, and a service scheduling management system 128 which processes and facilitates requests for the product service 160 to accompany, precede, or follow the product delivery 150. In respective examples, the delivery scheduling management system 130 and the service scheduling management system 128 are legacy systems, combined systems, or systems operated or hosted by a third party. In response to a purchase command or other commerce action for the product and service, the product and service sourcing engine 122 operates to coordinate transportation and delivery, such as with the following example scenario.

As shown, the fulfillment of the product delivery 150 and the product service 160 may be coordinated through multiple locations (e.g., "hops" among internal distribution network nodes) and actions that facilitate the transportation and movement of a product to the consumer location 112. This may include the shipping of the product from a distribution center 132 to a retail store or local distribution center 136 via an internal transfer channel 134, and the shipping of the product from the retail store or local distribution center 136 to the consumer location 112 through use of a local carrier 138. A particular event (e.g., date and time, or range of time) for the product delivery 150 from the local carrier 138 may be coordinated via the delivery scheduling management system 130, and a particular event (e.g., date and time, or range of time) for the product service 160 from a service provider 140 (e.g., an installer) may be coordinated via the service scheduling management system 128. In other examples, the fulfillment of the product delivery 150 may be provided third party shipping carriers, or the fulfillment of the product service 160 may be provided via third party contractors.

In an example, outlined further with the following discussion, an estimated product delivery and product service date, date range, or time window may be presented in a user interface on the consumer computing device 114 through data caching techniques. These dates may be offered through technical, back-end improvements to the user interface served from the use of cached data, with the cached data being updated via asynchronous transactions that coordinate updates to the scheduling transactions. Such caching techniques provide a significant advantage over a conventional request-response model that is performed synchronously with a scheduling service, such as a transaction that would need to be performed with the delivery scheduling management system 130 or the service scheduling management system 128 in real time.

Also in an example, outlined further in the following discussion, the data used to produce the estimated product delivery and product service times may be updated through optimization and estimated adjustments in a cached availability calendar. This optimization may be provided through an evaluation of the most-likely-next-scheduled service, to predict "low-risk" availability" for time windows that can fulfill the delivery or service scheduling time. This low-risk availability information may be updated asynchronously via reconciliation and updates outside of a customer shopping session.

Figure 2:
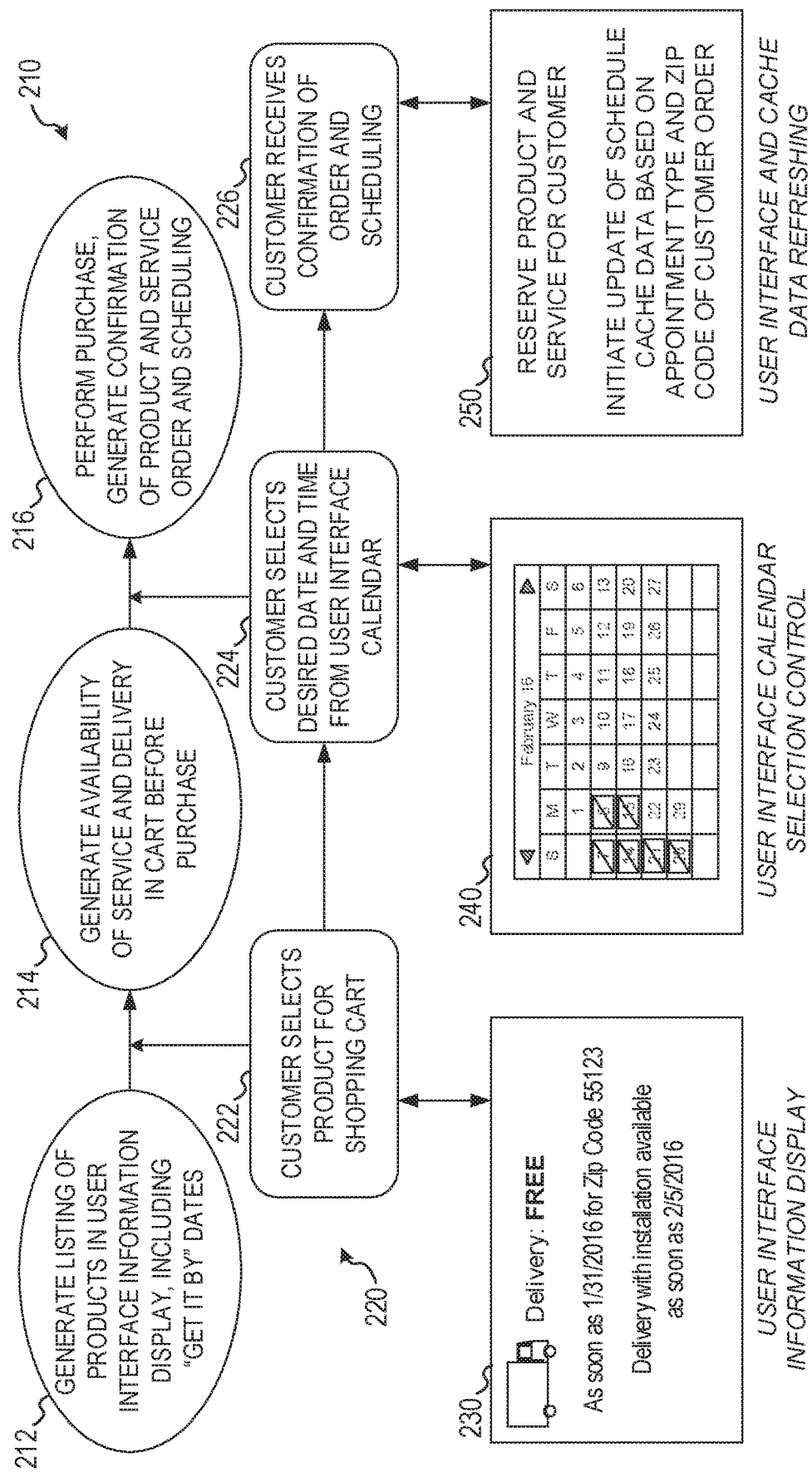
FIG. 2 illustrates user interface functionality to present and receive information and selection options for product delivery and services according to an example described herein.

FIG. 2 illustrates user interface functionality to present and receive information and selection options for product delivery and services according to an example described herein. As shown, a set of user interface operations 210 is provided in a sequence, with the respective operations being triggered as a result of customer operations 220. Although only three user interface operations 210 and only three customer operations 220 are depicted in the sequence, it will be understood that additional or substitute operations may occur as part of a consumer electronic commerce session.

The user interface operations 210 include the generation of a listing of products in a user interface information display (operation 212), such as the information illustrated to be output in a user interface information display 230. The user interface information display 230 may include information being output in a graphical user interface, such as textual or graphical information indicating one or more of delivery type, delivery cost, delivery parameters, earliest delivery date, earliest delivery date for a zip code or geographic area, earliest service date, or earliest service data to accompany delivery. In an example, the "as soon as" date provided in the user interface information display 230 is generated based on cached availability data maintained for the delivery or the service. For example, the user interface information display 230 may be output via a listing of search results (e.g., for matching products or a product category) or via a product information page (e.g., for detailed information on a particular product SKU or even a particular unit of a product SKU identifiable by a serial number).

The customer operations 220 include the selection of a particular product by a customer (operation 222), such as with the placement of a particular product into an electronic shopping cart used to purchase the product. In response to the customer selection, the user interface operations 210 proceed to generate a detailed availability of service and delivery dates (operation 214). For instance, the detailed availability of service and delivery dates or windows may be provided in a user interface calendar 240 displayed within the electronic shopping cart before a purchase is completed. In an example, the user interface calendar 240 is populated from the use of a cached data table that designates an estimated or delayed-update listing of availability for delivery or service performance on a particular day, based on available time windows (e.g., 8 AM-1 PM, 1-5 PM) on respective days. In a further example, the user interface calendar 240 may include a breakdown of the available time windows (such as to show 2, 3, 4, or more time windows available on a particular day, or even based on hourly or half-hourly time slots).

The data provided in the user interface calendar 240 may be generated from an estimation of a low risk availability for a particular date or time slot. For instance, for service scheduling, this availability may be calculated from the likelihood of whether an installation service for particular product can be achieved in a particular calendar window, based on the type of service to perform in the appointment, the amount of time typically required for the type of service in the geographic area, and the amount of time estimated to be available for the service. The amount of time needed to perform a particular service can also be dependent on the set of services offered, the core skill set by available installers, and historical scheduling times, on a national or local basis. In response to an output of the low risk availability information in the user interface calendar 240, the customer may select a desired date and time slot from the user interface calendar (operation 224).

In response to an indication to perform the purchase (such as in response to a customer action, not shown), an electronic processing system may perform the purchase, and generate a confirmation of the product and service order and scheduling parameters (operation 216). In response to the purchase activity, processing actions to begin completing or fulfilling the order, such as by reserving the product and reserving an accompanying delivery and service for the customer, may be performed. The customer may then receive confirmation of the order and the scheduling parameters (operation 226).

Further in response to performing the purchase, operations for user interface and cache data refreshing 250 may be performed. The update of the data may include the update of service scheduling cache data, based on the particular appointment type and zip code of the customer order. For example, cached data maintained for a time slot of particular service type in a particular geographic area (e.g., a plurality of zip codes) may be updated to remove availability for that time slot.

In one implementation, when determining if a particular installation service fits into a calendar window, the calendar assumes that the next scheduled service for that time window will involve an average (e.g., most common) order for the customer's zip code and the skill set needed to achieve this product. If the proposed installation service still fits into this block of time, then the block of time is offered as available. This calculation is performed before customer makes any selection, and before the scheduling service is ever contacted to schedule the actual work.

Figure 3:
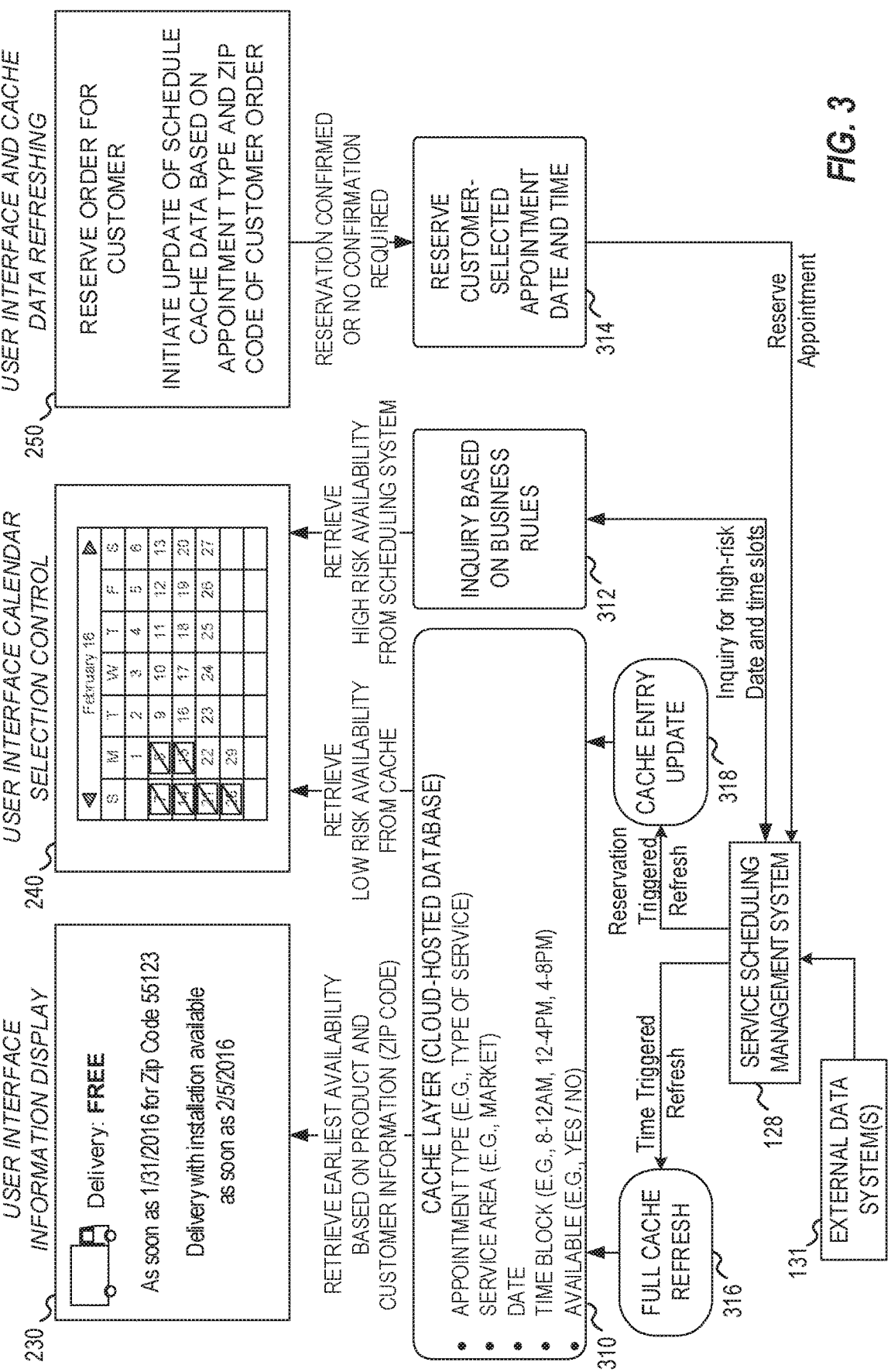
FIG. 3 illustrates system functionality to present and receive information and selection options for product delivery and services according to an example described herein.

FIG. 3 illustrates example system functionality to present and receive information and selection options for product delivery and services, with further use of the user interface information display 230, user interface calendar 240, and the user interface and cache data refreshing 250 described above. As shown, the user interface information display 230 is populated from a retrieval of an earliest availability value from the cache layer 310 based on product information (e.g., a product model that is associated with a product type and installation service type) and customer information (e.g., a zip code associated with a detected location, IP address, customer profile, etc.). Further, the information in the user interface calendar 240 is populated based on low-risk availability from the cache layer 310.

In an example, the cache layer 310 maintains cache data values for an appointment type (e.g., a type of service), a geographic service area (e.g., a market with a plurality of defined zip codes), date, time block (e.g., 4-hour windows), and the availability (e.g., a yes/no binary indication). For example, the cache layer may be queried to obtain the availability value associated with an appointment type (e.g., washer installation), a service area (e.g., zip code 55123, within the Minneapolis service area), a date (e.g., February 5) and a time slot (e.g., 12-4 PM).

The cached calendar data for available scheduling windows may be updated based on actual orders received, schedule changes, and optimizations to re-arrange orders within scheduling windows. The cached calendar data also may be updated nightly, weekly, and on-demand based on inter-day event updates. For example, the information stored in the cache layer 310 may be initially generated or re-generated from a full cache refresh, triggered at a scheduled time, using data from the service scheduling management system 128. Individual cache entries and availability may also change with a cache entry update 318, such as may occur as a result of reservations received from the service scheduling management system 128. The data or operations provided within the service scheduling management system 128 may be further populated or affected by one or more external data systems 131.

As shown in FIG. 3, the population of the user interface calendar 240 may present a low-risk availability for a date or time window using the cache layer 310. The user interface calendar 240 or an accompanying user interface feature may also display high-risk availability from a scheduling system, such as during the purchase of a product, once the consumer has added the product to a shopping cart or has completed the purchase activity (e.g., with purchase actions that reserve a customer-selected appointment date and time 314). The high risk availability information provided in the user interface calendar 240 may be provided from an inquiry for high-risk date and time slots, such as from direct inquiries to the service scheduling management system 128. The high-risk availability information may be obtained via an inquiry based on business rules 312, such as business rules built into the user interface or a service layer. The inquiry for high-risk date and time slots may provide a more accurate or precise availability for a particular service, but at the expense of additional transaction time.

As further shown in FIG. 3, the operations in the user interface and cache data refreshing 250 may occur when a reservation is confirmed or when no confirmation is required. The reservation of a customer-selected appointment date and time (e.g., as selected based on low-risk availability or from high-risk availability) may cause an appointment reservation to be implemented (e.g., created, updated) within the service scheduling management system 128. Other updates to the cache data refreshing 250 may occur in response to time triggers, event triggers, or even consumption triggers (e.g., sale of a particular number of products, or sale of a particular type of product).

FIG. 4 illustrates a user interface layout 400 adapted to present and receive information and selection options for product delivery and services according to an example described herein. For example, the user interface layout 400 may embody features of the user interface information display 230 described above. As shown in FIG. 4, the user interface layout 400 provides an interface with a number of information selection and display options, specifically depicting search results 420 for a particular product type (a brand of washing machine). It will be understood that the example of the user interface layout 400 is not limited to the presentation of appliances, as other types of products, product features, and accompanying services may also be presented or advertised.

The user interface layout 400 specifically depicts the listing of three products for purchase, in addition to search options (410A-410) that can refine or limit the search results. As shown, the search options include a series of user interface checkboxes that allow the inclusion or exclusion based on product features (product color 410A and product capabilities 410B), price for the product (410C), delivery date for the product (410D), and installation date for the product (410E), with installation being an example type of service that is offered to accompany the product. For example, a consumer may choose to select one or more of the user interface checkboxes to expand or limit the search results 420. Further, the presented search results may be limited by delivery or pickup criteria, such as a selection option 430 to present only search results that are available for immediate pick up at a location.

The information that is presented in the search results 420 may include product delivery dates and product service dates, produced from the caching availability calendar discussed above. For example, information presented for a first product may include a corresponding first delivery date 422A, a store pickup date 424A, and a delivery with installation service date 426A; the information presented for a second and third product may include a corresponding second and third delivery date 422B, 422C, a store pickup date 424B, 424C, and a delivery with installation service date 426B, 426C. Each of the search results may include a purchase selection option, such as respective "Add to Cart" buttons 428A, 428B, 428C for the first, second, and third buttons.

Figure 5:
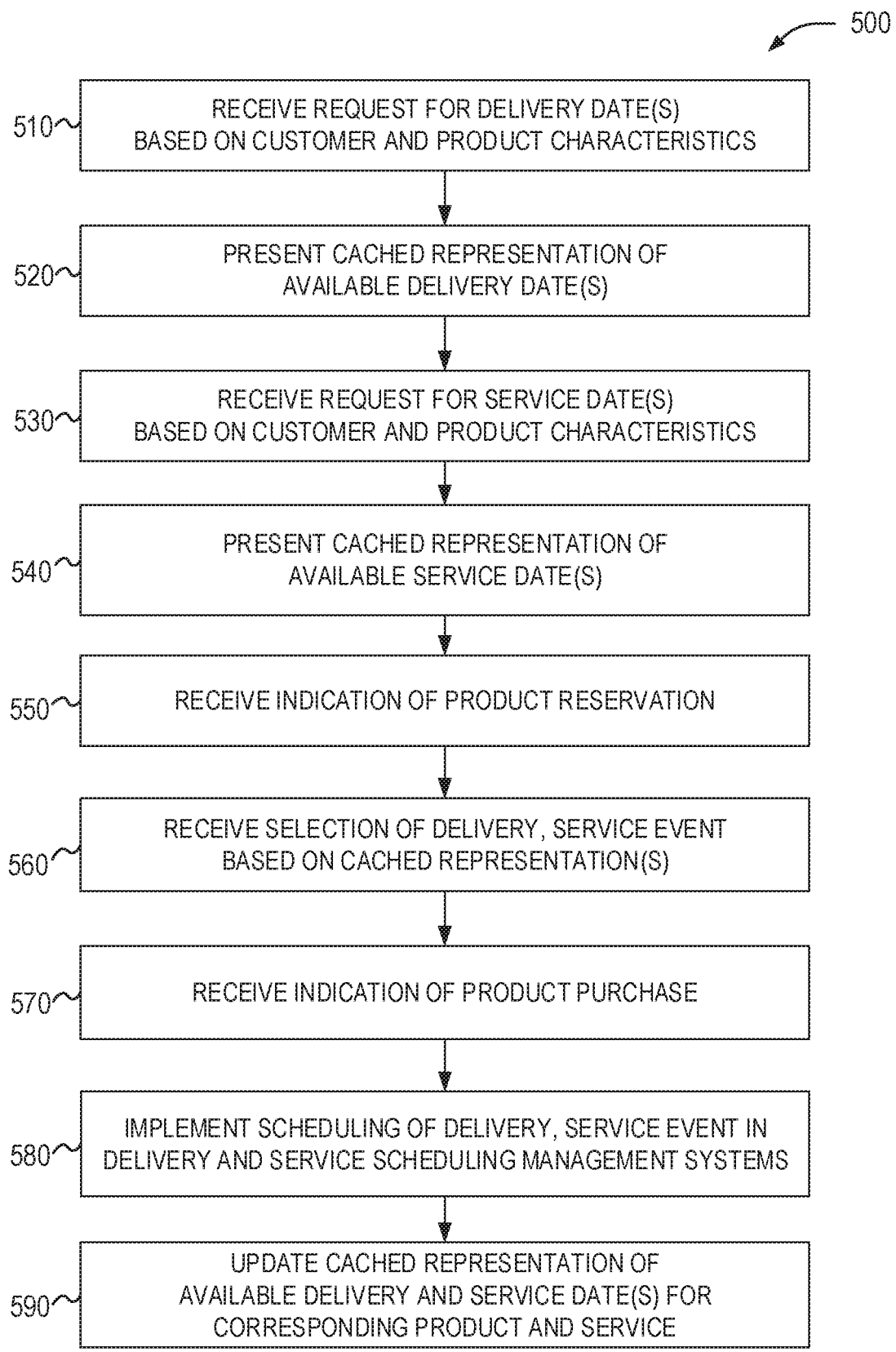
FIG. 5 illustrates a flowchart of a technique for receiving and presenting cached product delivery and service information according to an example described herein.

FIG. 5 illustrates a flowchart 500 of an example technique for receiving and presenting cached product delivery and service information. The flowchart is depicted from the perspective of a data processing system, such as a data processing system including by a web server or software interface that receives and coordinates operations with a cached data store and a user interface processing system. It will be understood that the following caching techniques may be applicable for both e-commerce settings in addition to other types of scheduling settings.

The flowchart 500 specifically depicts a scenario for providing a cached representation of delivery and service dates or times, such as may be provided in an electronic commerce user interface. As shown, the operations of the flowchart 500 commence with the receipt of a request for one or more available (e.g., open, unscheduled) delivery dates for some product, based on customer characteristics (e.g., customer delivery constraints, customer location, zip code, etc.) and product characteristics (e.g., product type, product weight, transit time, transit hops, etc.) (operation 510). The request for the one or more available delivery dates is fulfilled by retrieval of information from a cached data store, and the presentation of one or more available delivery dates (operation 520). In a similar fashion, the operations of the flowchart 500 continue with the receipt of a request for one or more available service dates, such as for a service to accompany a product or a product delivery, based on customer characteristics and product characteristics (operation 530). The request for the one or more available service dates is fulfilled by retrieval of information from the cached data store, and the presentation of one or more available service dates (operation 540). In an example, the service dates are the same or follow those of available delivery, such as for a service that must occur at or after the time of delivery.

The flowchart 500 continues with the receipt of an indication of a product reservation (operation 550), such as may be received in an electronic commerce user interface by adding the item to an electronic shopping cart, receiving a request to reserve, receiving a request to checkout, or the like. The selection of a particular delivery and service event or designation (e.g., a chosen time slot by a consumer), that is associated with a cached representation of a delivery or service date or time, also may be received within the electronic commerce user interface (operation 560).

Finally, the flowchart 500 concludes with the receipt of an indication of a product purchase in the electronic commerce user interface, such as may be provided from a checkout command or a payment processing screen. The scheduling of the delivery and service event in respective delivery and service scheduling management systems (or in a same system) may occur in response to payment processing or like confirmation from a consumer or a supervising user (operation 580). After scheduling the delivery or service event in a particular date or time slot, the cached representation of the available delivery or service date is updated for the corresponding product and service (operation 590). This reservation may be made based on a rough availability and approximation of the average time needed to perform a particular service for a type of product in a zip code. Further operations to update and rearrange the schedule based on actual scheduling details may be performed at a later time (such as discussed below with reference to the refresh techniques depicted in FIG. 7.)

Figure 6:
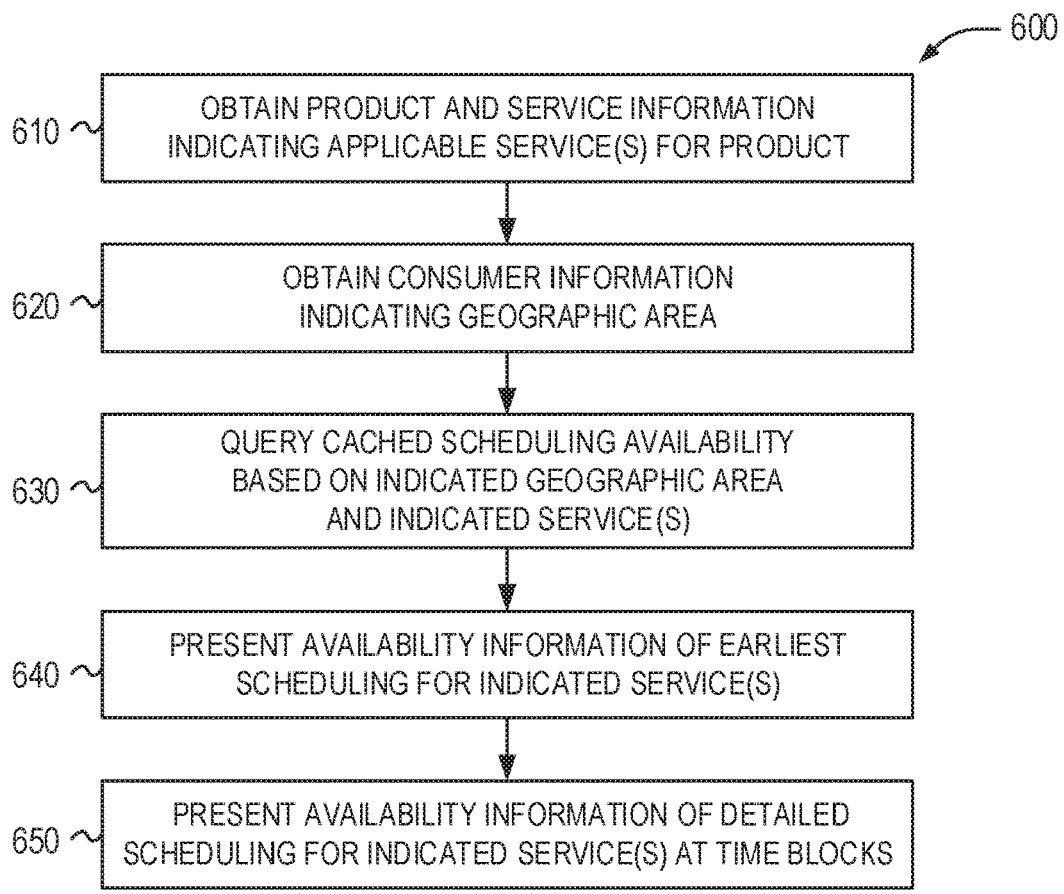
FIG. 6 illustrates a flowchart of a technique for obtaining and presenting scheduling availability information from cached service information according to an example described herein.

FIG. 6 illustrates a flowchart 600 of an example technique for obtaining and presenting scheduling availability information from cached service information. The operations of the flowchart 600 may be integrated, for example, into the operations of flowchart 500, but are depicted from the perspective of a user interface processing system that is adapted to obtain, generate, and output a presentation of information.

As shown, the flowchart 600 includes operations to obtain data used for obtaining cached scheduling availability. The operations to obtain relevant data may include obtaining (e.g., retrieving, querying) product and service information that indicates one or more applicable services for a particular product (operation 610), and obtaining (e.g., retrieving, querying) consumer information that indicates a geographic area (operation 620). For example, a consumer may utilize a user interface input to indicate the delivery or service scheduling for a particular product or type of product (e.g., through a search box), and the consumer may also utilize a user interface input to indicate a delivery or service location (e.g., through input of a zip code or address for delivery and service).

Based on the data used for obtaining cached scheduling availability, the user interface processing system may perform operations to query the cached scheduling availability (operation 630). This query may specify one or more services, products, or a geographic area to obtain scheduling availability. In an example, the scheduling availability may be queried to retrieve all available time slots or dates in a geographic area for a particular service. Also in an example, the scheduling availability may be queried to retrieve a first available time slot in a geographic area which meets particular qualifications.

The results of the query may be used to present estimated availability information of an earliest scheduling date for an indicated service (operation 640), and to present availability information of detailed scheduling for an indicated service at respective time blocks (operation 650). An example of an earliest scheduling date may include an indication that a product can be installed "as soon as" as certain date. An example of detailed scheduling may be provided in a calendar or chart that indicates availability for a plurality of time blocks within a time range (e.g., within a particular month, week, or day). Although the examples of the flowchart 600 are depicted and described with reference to a service accompanying a product, it will be understood that similar techniques may be used to provide a presentation of data representing estimated availability information for a product delivery without a service, or for a service that occurs independently of a product delivery.

Figure 7:
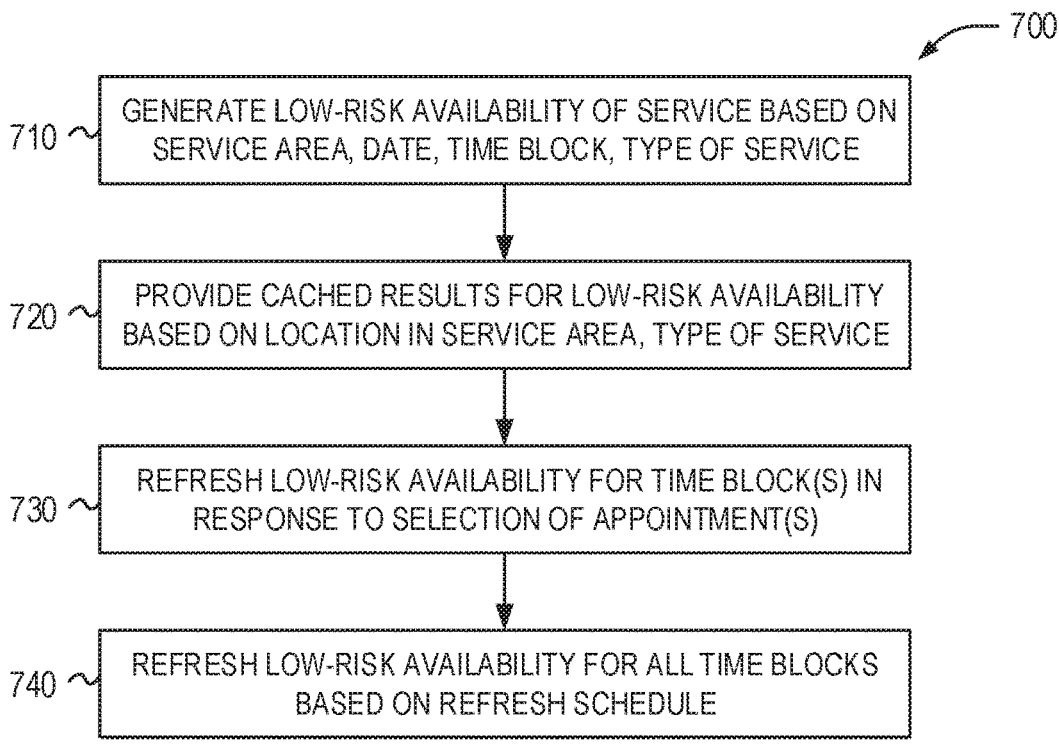
FIG. 7 illustrates a flowchart of a technique for updating a cache maintained for product delivery or service scheduling according to an example described herein.

FIG. 7 illustrates a flowchart 700 of an example technique for updating a cache maintained for product delivery or service scheduling. As shown, an estimated, "low-risk" availability of a particular service may be initially generated based on a service area, date, time block, type of service, or like characteristics (operation 710). Such cached data values may be hosted in a cached data store based on initial values indicated by a service scheduling management system. The cached results for a schedule of low-risk availability may be provided based on a location of a desired service in a particular geographic area (e.g., a service area for a service provider) and the type of service (e.g., an installation service to accompany a delivery) (operation 720).

The results for the low-risk availability for one or more time blocks that are scheduled may be refreshed in response to a selection of one or more appointments to reserve such time blocks (operation 730). This refresh may occur in an on-demand setting, such as in response to the reservation of a particular appointment with the service scheduling management system. The results for all time blocks in the low-risk availability may be refreshed in response to a refresh schedule (e.g., on a scheduled basis) such as with a daily, overnight, or weekly run to populate the cached data store (operation 740).

Figure 8:
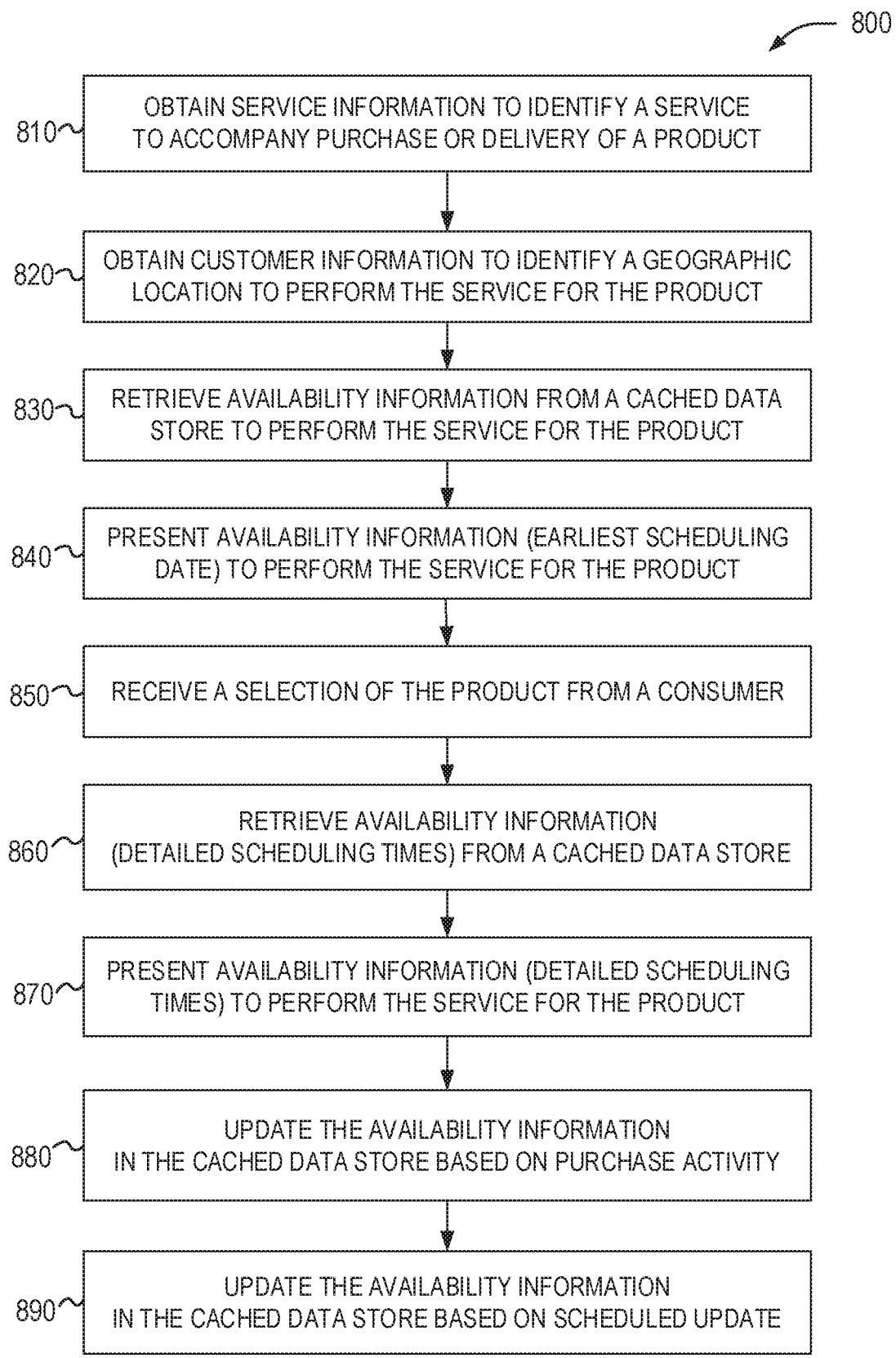
FIG. 8 illustrates a flowchart of an example method for presenting cached availability information in a user interface according to an example described herein.

FIG. 8 illustrates a flowchart of an example method for presenting cached availability information for a service in a user interface according to an example. It will be understood that the operations of the flowchart 800 may be implemented in connection with a computer-implemented method, instructions on a computer readable medium, or on a configuration of a computing device (or among multiple of such methods, products, or computing devices). In an example, the electronic operations are performed by a computing device that operates as a server to host and generate features of a client-accessible user interface (e.g., from a web server); in another example, the electronic operations are performed within aspects of distributed or client computing devices used to present the user interface.

As shown, the operations of the flowchart may commence to obtain service information to identify a service to accompany delivery of a product, such as an installation service offering for a home appliance or electronics item (operation 810). In an example, the service information is represented by data that is associated with operational characteristics of a product, such as optional services (e.g., hookup, mounting, removal) that may be performed on demand by a skilled service provider before, during, or after the time of delivery of the product. The operations of the flowchart continue to obtain customer information to identify a geographic location to perform the service for the product (operation 820). In an example, the geographic location is a zip code (postal code) of a customer that is obtained from geolocation or profile information from a user interface session with the customer.

The operations of the flowchart continue to retrieve, from a cached data store, availability information to perform the service for the product (operation 830). In an example, this availability information is retrieved based on the geographic location and the service information, such as to match availability information for an installation service of a particular product in a particular geographic area (identified by zip code). In an example, this availability information may be stored based on a type of service, a geographic service area, and date and time block. In an example, this availability information may reflect an estimated projection of whether any service provider is available; in another example, this availability information may reflect an estimated projection of whether a particular type of service provider is available, or an estimated number of open service units for a particular time slot.

The operations of the flowchart continue to present the availability information, such as in the form of an earliest scheduling date, to perform the service for the product (operation 840). In a further example, the availability information to perform the service for the product is presented in listing of a plurality of products, such that a respective earliest scheduling date is presented for each of the plurality of products.

The operations of the flowchart continue to receive a selection of the product from a consumer in the user interface (operation 850). In response to this selection, detailed availability information such as detailed scheduling times are retrieved from the cached data store (operation 860) and presented (operation 870). In a further example, the availability information to perform the service indicates availability to perform the service for the product at a plurality of time blocks on a plurality of days. For example, this may be presented in a calendar interface, where the availability to perform the service for the product at the plurality of time blocks on the plurality of days is determined based on an estimated time to perform the service for the product based on a class of services for the product in a geographic area corresponding to the geographic location. In still a further example, the selection for the product occurs from a consumer command received in the user interface to purchase the product, such as implemented with an "Add to Cart" feature of an electronic shopping cart.

The operations of the flowchart concluded to update the availability information in the cached data store, based on purchase activity (operation 880) or based on a scheduled update (operation 890). In an example, in response to the selection of the product, such as an "Add to Cart" feature, the availability information to perform the service for the product may be updated to temporarily reserve a time slot for the consumer. In an example, the availability information to perform the service for the product may be updated in response to an indication received from a consumer in the user interface to purchase the product. In an example, the availability information to perform the service for the product may be updated in response to a scheduled event or time, such as nightly, weekly, or in response to another scheduled time.

The example operations of flowchart 800 may be performed at or among concerted functions of a client or server computing device. In an example, the software application is adapted to execute on the server computing device with use of a processor and a memory device. In another example, the presentation functions of the software application are adapted to execute in an app or browser of a client computing device, such as through a communication session provided via a web server or a software application interface. The example operations of flowchart 800 may be performed through a system comprising a service schedule caching engine and an electronic user interface system, which is configured to provide cached data on behalf of a delivery scheduling management system adapted to coordinate scheduling of delivery of the product and a service scheduling management system adapted to coordinate scheduling of service to accompany delivery of the product. Other combinations and subsystems may be implemented with the operations of flowchart 800, such as illustrated with the following components in FIG. 9.

Figure 9:
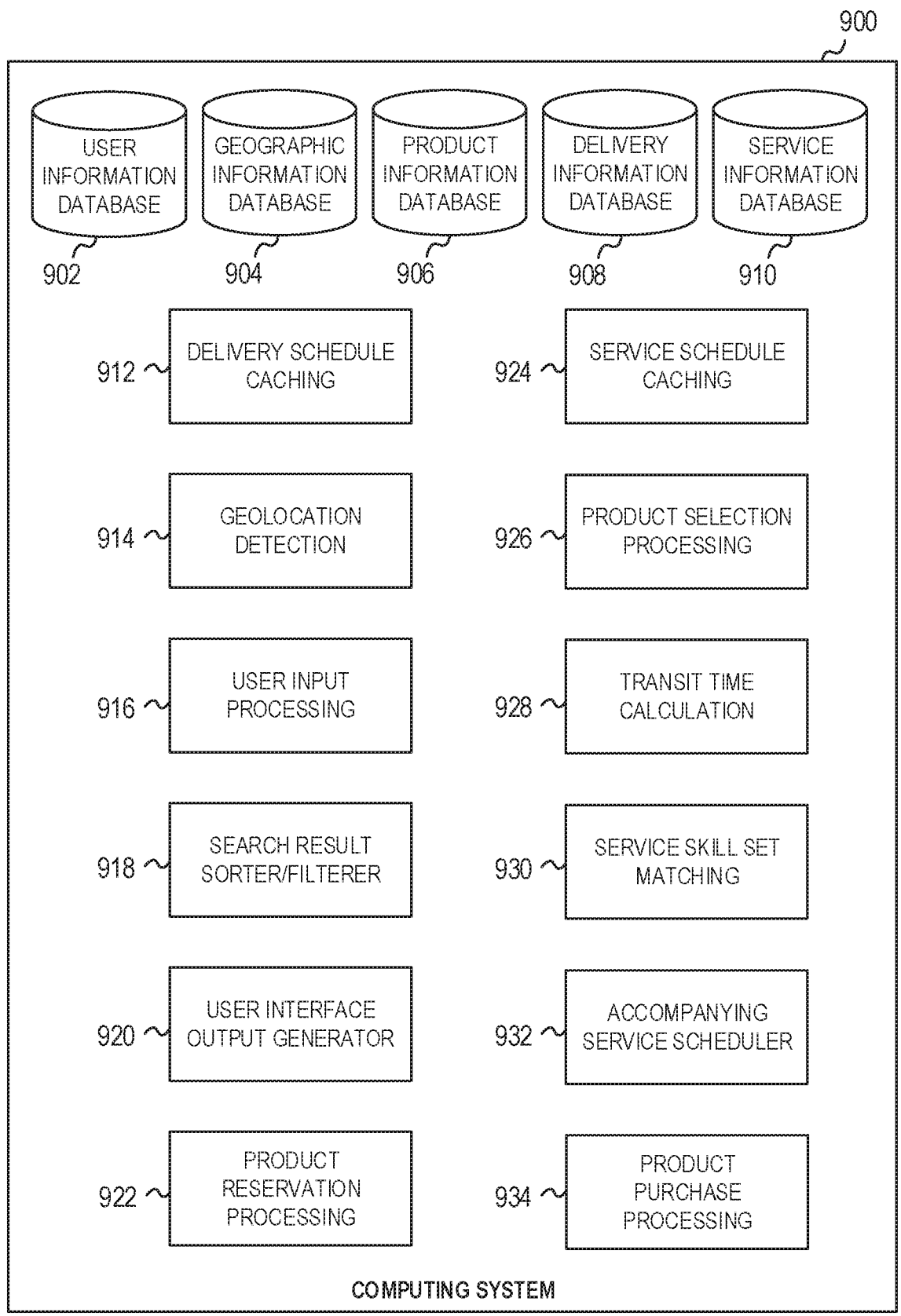
FIG. 9 illustrates a block diagram of processing and functionality components operable in a computing system implementing product delivery or service scheduling techniques according to an example described herein.

FIG. 9 illustrates a block diagram of hardware and functional components of a computing system 900 to implement operations for updating and presenting cached availability information in a user interface, such as are accomplished with the examples described above. It will be understood, that although certain hardware and functional components are depicted in FIG. 9 and in other drawings as separate subsystems or services, the features of the subsystems or services may be integrated into a single system or service (e.g., in an application programming interface hosted by a server computing system). Further, although only one computing system is depicted, it will be understood that the features of these systems may be distributed among one or multiple computing systems (including in cloud-based processing settings).

As shown, the computing system 900 includes various functionality subsystems 912-934 used to implement cached availability information for a product or service (e.g., to implement the techniques discussed above for FIGS. 1-8) and databases 902-910 to store information for the cached availability information and to facilitate selection, purchase, and fulfillment of the product or service. In an example, the computing system 900 is adapted to execute software applications that implement the functionality subsystems and databases, through software application processing components and functionality, such as circuitry and software instructions.

In an example, the client computing system 910 is adapted to implement respective features including: delivery schedule caching processing or functionality 912 (e.g., circuitry or software instructions) used to maintain, access, and update cached data for a delivery availability schedule; service schedule caching processing or functionality 924 (e.g., circuitry or software instructions) used to maintain, access, and update cached data for a service availability schedule; geolocation detection processing or functionality 914 (e.g., circuitry or software instructions) used to maintain, access, and update cached scheduling data for a user based on geolocation or other geographic information associated with the user; product selection processing or functionality 926

(e.g., circuitry or software instructions) used to select, reserve, designate, or query product information and associated product data, such as for product data served from a website or internet service; transit time calculation processing or functionality 928 (e.g., circuitry or software instructions) used to calculate transit times for products, services, or related items from product or service sources; search result sorter/filterer processing or functionality 918 (e.g., circuitry or software instructions) used to compile, refine, or update product or service listings provided in search results of a user interface; service skill set matching processing or functionality 930 (e.g., circuitry or software instructions) used to match a particular service skill with a particular product, or to match a particular service provider having a particular service skill with a particular service offering; user interface output generator processing or functionality 920 (e.g., circuitry or software instructions) used to host, refresh, update, or generate aspects of a user interface to provide product and service information and product and service scheduling functionality; accompanying service scheduler processing or functionality 932 (e.g., circuitry or software instructions) used to identify and suggest a service to accompany a purchase of a product; and product purchase processing or functionality 934 (e.g., circuitry or software instructions) used to facilitate electronic payment, reservation, and sourcing of a product, such as in response to user interaction received in an electronic commerce user interface. Other functional and processing aspects may be performed or structurally embodied by the computing system 900 to implement the techniques discussed above for FIGS. 1-8.)

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
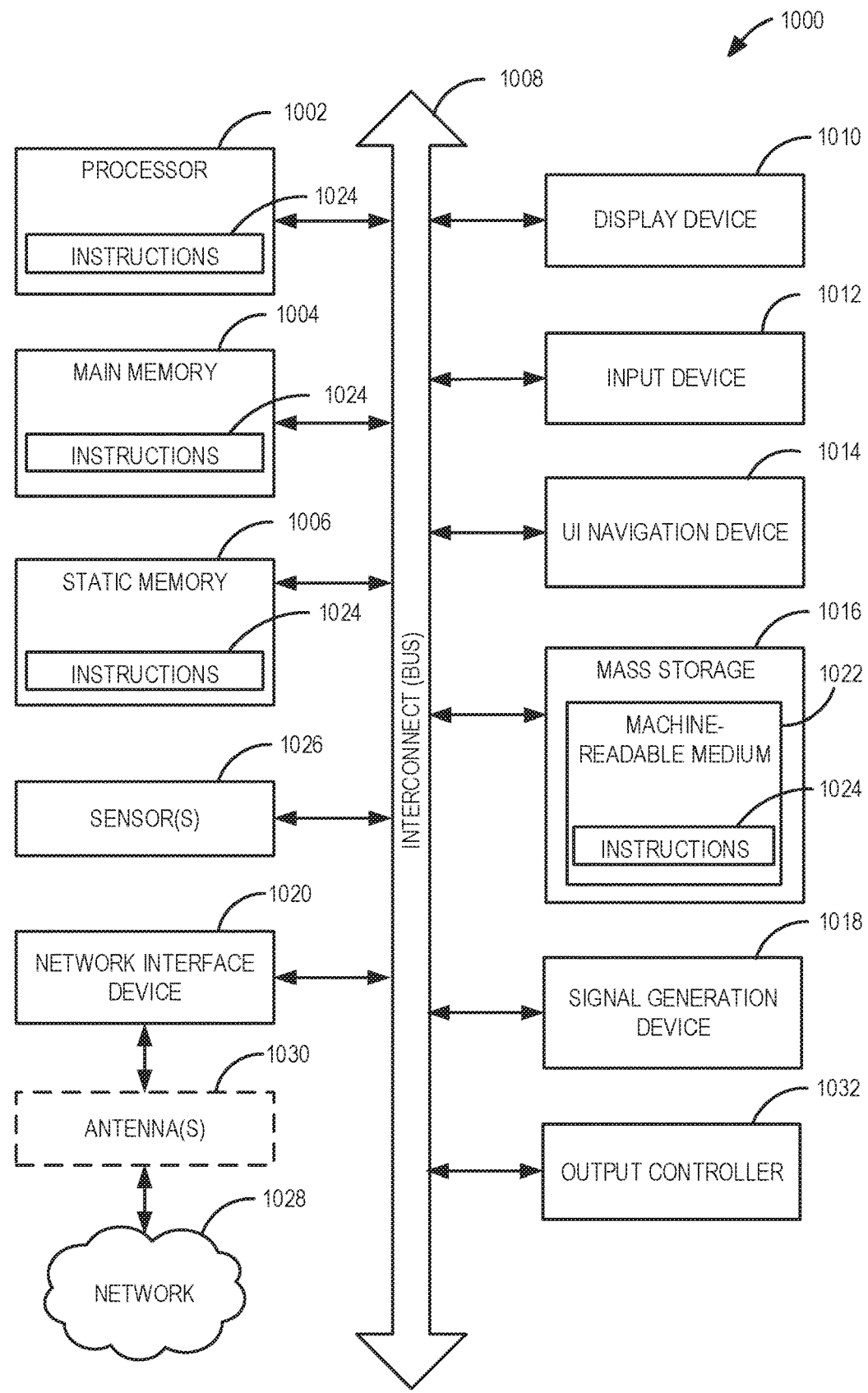
FIG. 10 illustrates a block diagram of operational components of a computing system upon which any one or more of the techniques herein discussed may be executed and implemented.

FIG. 10 illustrates a block diagram illustrating a machine in the example form of a computer system 1000, within which a set or sequence of instructions may be executed to cause the machine to perform any one of the methodologies discussed herein, according to an example. Computer system machine 1000 may be embodied by the computing system 900; the subsystem(s) implementing the data stores 902-910; the subsystem(s) implementing the various modules or functionality 912-934; the systems and engines 122, 124, 126, 128, 130 and interface 116; the consumer computing device 114; or any other electronic processing or computing platform described or referred to herein. Further, the computer system machine 1000 may embody instructions and data to perform any of the interfaces or functions referenced for FIGS. 1-9.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A computer system comprising:
a processor; and
memory coupled to the processor and storing instructions that, when executed by the processor, cause the computer system to perform operations that:
obtain service information to identify a service to accompany delivery of a product, wherein a type of the service encompasses a plurality of services;
obtain customer information to identify a geographic location to perform the service for the product, wherein the geographic location is within a zip code geographic area;
retrieve, from a cached data store, cached availability information to perform the type of the service for the product, the cached availability information retrieved based on the zip code geographic area and the type of the service identified from the service information,
wherein the cached availability information is pre-populated in the cached data store from estimated availability information obtained from a scheduling system,
wherein the scheduling system maintains a schedule for performing the type of the service, and
wherein the estimated availability information indicates an estimated low-risk availability to perform the type of the service within multiple time windows on a particular date, based on an average time to perform the type of the service in the zip code geographic area;
wherein the cached availability information is retrieved from the cached data store, independent from a scheduling transaction with the scheduling system, to obtain the estimated availability to perform the type of the service within multiple time windows on the particular date, without accessing the schedule; and
present, in a user interface, the cached availability information to perform the service for the product on the particular date, based on the estimated availability of the average time to perform the type of the service in the zip code geographic area, as indicated in the cached data store, prior to performing the scheduling transaction with the scheduling system to schedule performance of the service at the geographic location.

2. The computer system of claim 1, wherein the cached availability information to perform the service for the product indicates an earliest scheduling date to perform the type of the service at the geographic location.

3. The computer system of claim 2, wherein the cached availability information to perform the service for the product is presented in listing of a plurality of products, wherein a respective earliest scheduling date is presented for each of the plurality of products.

4. The computer system of claim 1, the computer system to perform further operations that:
receive a selection of the product from a consumer in the user interface; and
update the cached availability information in the cached data store, in response to the selection of the product, wherein the cached availability information to perform the type of the service for the product, as maintained in the cached data store, is updated to temporarily reserve a time slot of the respective time windows for the consumer.

5. The computer system of claim 1, wherein the cached availability information to perform the type of the service indicates the estimated availability to perform the type of the service for the product at a plurality of time blocks on a plurality of days.

6. The computer system of claim 5, wherein the estimated availability to perform the type of the service for the product at the plurality of time blocks on the plurality of days is determined based on an estimated time to perform the service for the product based on a class of services associated with the product, as determined in a geographic area corresponding to the geographic location, based on data maintained in the cached data store.

7. The computer system of claim 1, the computer system to perform further operations of performing the scheduling transaction with the scheduling system, with operations that:
retrieve, from the scheduling system, detailed availability information to perform the service for the product based on the geographic location and the service information; and
present, in the user interface, the detailed availability information to perform the service for the product;
wherein the operations to retrieve and present the detailed availability information are performed in response to an indication of a selection for the product received in the user interface.

8. The computer system of claim 7, wherein the selection for the product occurs in response to an indication received from a consumer in the user interface to purchase the product.

9. The computer system of claim 8, further comprising operations that:
update the cached availability information in the cached data store, in response to the selection from the consumer, received in the user interface, to purchase the product.

10. The computer system of claim 1, wherein the user interface is displayed on a website provided by a web server or displayed via a software application in communication with an application server.

11. The computer system of claim 1, wherein the average time to perform the type of the service is based on a historical average time duration in the zip code geographic area to complete one or more installation services that accompany delivery of the product.

12. A method, comprising a plurality of electronic operations executed with a processor and memory of a computing device, the plurality of electronic operations including:
obtaining service information to identify a service to accompany delivery of a product, wherein a type of the service encompasses a plurality of services;
obtaining customer information to identify a geographic location to perform the service for the product, wherein the geographic location is within a zip code geographic area;
retrieving, from a cached data store, cached availability information to perform the type of the service for the product, the cached availability information retrieved based on the zip code geographic area and the type of the service identified from the service information, wherein the cached availability information is prepopulated in the cached data store from estimated availability information obtained from a scheduling system,
wherein the scheduling system maintains a schedule for performing the type of the service, and
wherein the estimated availability information indicates an estimated low-risk availability to perform the type of the service within multiple time windows on a particular date, based on an average time to perform the type of the service in the zip code geographic area:
wherein the cached availability information is retrieved from the cached data store, independent from a scheduling transaction with the scheduling system, to obtain the estimated availability to perform the type of the service within multiple time windows on the particular date, without accessing the schedule; and
presenting, in a user interface, the cached availability information to perform the service for the product on the particular date, based on the estimated availability of the average time to perform the type of the service in the zip code geographic area, as indicated in the cached data store, prior to performing the scheduling transaction with the scheduling system to schedule performance of the service at the geographic location.

13. The method of claim 12, wherein the cached availability information to perform the service for the product indicates: an earliest scheduling date, or the estimated availability to perform the type of the service for the product at a plurality of time blocks on a plurality of days.

14. The method of claim 13, wherein the estimated availability to perform the type of the service for the product is determined based on an estimated time to perform the type of the service for the product based on a class of services associated with the product, as determined in a geographic area corresponding to the geographic location, based on data maintained in the cached data store.

15. The method of claim 12, the plurality of electronic operations further including:
receiving a selection of the product from a consumer in the user interface; and
updating the cached availability information in the cached data store, in response to the selection of the product received in the user interface, wherein the cached availability information to perform the service for the product, as maintained in the cached data store, is updated to temporarily reserve a time slot of the respective time windows for the consumer.

16. The method of claim 12, the plurality of electronic operations further including performing the scheduling transaction with the scheduling system, with operations that:
retrieve, from the scheduling system, detailed availability information to perform the service for the product based on the geographic location and the service information; and
present, in the user interface, the detailed availability information to perform the service for the product;
wherein the electronic operations to retrieve and present the detailed availability information are performed in response to an indication received from a consumer in the user interface to purchase the product.

17. The method of claim 12, the plurality of electronic operations further including:
updating the cached availability information in the cached data store, in response to:
an indication received from a consumer in the user interface to purchase the product, or a scheduled update frequency.

18. The method of claim 12, wherein the average time to perform the type of the service is based on a historical average time duration in the zip code geographic area to complete one or more installation services that accompany delivery of the product.

19. A non-transitory computer-readable storage medium, the computer-readable storage medium including instructions that, when executed by a processor and memory of a computing device, causes the computing device to perform operations that:
obtain service information to identify a service to accompany delivery of a product, wherein a type of the service encompasses a plurality of services;
obtain customer information to identify a geographic location to perform the service for the product, wherein the geographic location is within a zip code geographic area;
retrieve, from a cached data store, cached availability information to perform the type of the service for the product, the cached availability information retrieved based on the zip code geographic area and the type of the service identified from the service information,
wherein the cached availability information is prepopulated in the cached data store from estimated availability information obtained from a scheduling system,
wherein the scheduling system maintains a schedule for performing the type of the service, and
wherein the estimated availability information indicates an estimated low-risk availability to perform the type of the service within multiple time windows on a particular date, based on an average time to perform the type of the service in the zip code geographic area;
wherein the cached availability information is retrieved from the cached data store, independent from a scheduling transaction with the scheduling system, to obtain the estimated availability to perform the type of the service within multiple time windows on the particular date, without accessing the schedule; and
present, in a user interface, the cached availability information to perform the service for the product on the particular date, based on the estimated availability of the average time to perform the type of the service in the zip code geographic area, as indicated in the cached data store, prior to performing the scheduling transaction with the scheduling system to schedule performance of the service at the geographic location.

20. The computer-readable storage medium of claim 19, wherein the cached availability information to perform the service for the product indicates: an earliest scheduling date, or the estimated availability to perform the type of the service for the product at a plurality of time blocks on a plurality of days.

21. The computer-readable storage medium of claim 20, wherein the estimated availability to perform the service for the product is determined based on an estimated time to perform the type of the service for the product based on a class of services associated with the product in a geographic area corresponding to the geographic location, based on data maintained in the cached data store.

22. The computer-readable storage medium of claim 19, the computing device to perform further operations that:

update the cached availability information in the cached data store, in response to selection of the product, wherein the cached availability information to perform the service for the product is updated to temporarily reserve a time slot of the respective time windows to perform the service for the product.

23. The computer-readable storage medium of claim 19, the computing device to perform further operations of performing the scheduling transaction with the scheduling system, with operations that:
retrieve, from the scheduling system, detailed availability information to perform the service for the product based on the geographic location and the service information; and
present, in the user interface, the detailed availability information to perform the service for the product;
wherein the operations to retrieve and present the detailed availability information are performed in response to an indication received from a consumer in the user interface to purchase the product.

24. The computer-readable storage medium of claim 19, wherein the average time to perform the type of the service is based on a historical average time duration in the zip code geographic area to complete one or more installation services that accompany delivery of the product.

25. A system comprising:
at least one processor;
at least one computer-readable storage medium;
a service schedule caching engine implemented using the at least one processor and the at least one computer-readable storage medium, the at least one computer-readable storage medium including a first set of instructions stored thereon which, when executed, cause the at least one processor to:
obtain service information to identify a service to accompany delivery of a product, wherein a type of the service encompasses a plurality of services;
obtain customer information to identify a geographic location to perform the service for the product, wherein the geographic location is within a zip code geographic area;
generate, using data from a cached data store, cached availability information to perform the type of the service for the product, the cached availability information based on the zip code geographic area and the type of the service identified from the service information,
wherein data for the cached availability information is pre-populated in the cached data store from estimated availability information obtained from a scheduling system,
wherein the scheduling system maintains a schedule for performing the type of the service, and
wherein the estimated availability information indicates an estimated low-risk availability to perform the type of the service within multiple time windows on a particular date, based on an average time to perform the type of the service in the zip code geographic area;
wherein the cached availability information is retrieved from the cached data store, independent from a scheduling transaction with the scheduling system, to obtain the estimated availability to perform the type of the service within multiple time windows on the particular date, without accessing the schedule; and
an electronic user interface system implemented using the at least one processor and the at least one computer-readable storage medium, the at least one computer-readable storage medium including a second set of instructions stored thereon which, when executed, cause the at least one processor to:
present, in a user interface, the cached availability information to perform the service for the product on the particular date, based on the estimated availability of the average time to perform the type of the service in the zip code geographic area, as indicated in the cached data store, prior to performing the scheduling transaction with the scheduling system;
wherein the user interface is communicated to a client computing device via a website provided by the electronic user interface system or via a software application interface.

26. The system of claim 25, wherein the cached availability information to perform the service for the product indicates: an earliest scheduling date to perform the type of the service at the geographic location, or the estimated availability to perform the type of the service for the product at a plurality of time blocks on a plurality of days;
wherein the estimated availability to perform the service for the product is determined based on an estimated time to perform the service for the product based on a class of services associated with the product in a geographic area corresponding to the geographic location, based on data maintained in the cached data store; and
wherein the average time to perform the type of the service is based on a historical average time duration in the zip code geographic area to complete one or more installation services that accompany delivery of the product.

27. The system of claim 25, further comprising:
a delivery scheduling management system adapted to coordinate scheduling of the delivery of the product, wherein the cached availability information to perform the service for the product is generated for the cached data store based on available scheduling information for delivery of the product, using data processed and stored by the delivery scheduling management system; and
a service scheduling management system adapted to coordinate scheduling of the service to accompany the delivery of the product, wherein the cached availability information to perform the service for the product is generated for the cached data store based on available scheduling information for the service corresponding to the product, using data processed and stored by the service scheduling management system.

\* \* \* \* \*